No. 665,597. Patented Jan. 8, 1901.
J. W. CRAIG.
ANIMAL TRAP.
(Application filed Apr. 18, 1900.)
(No Model.)
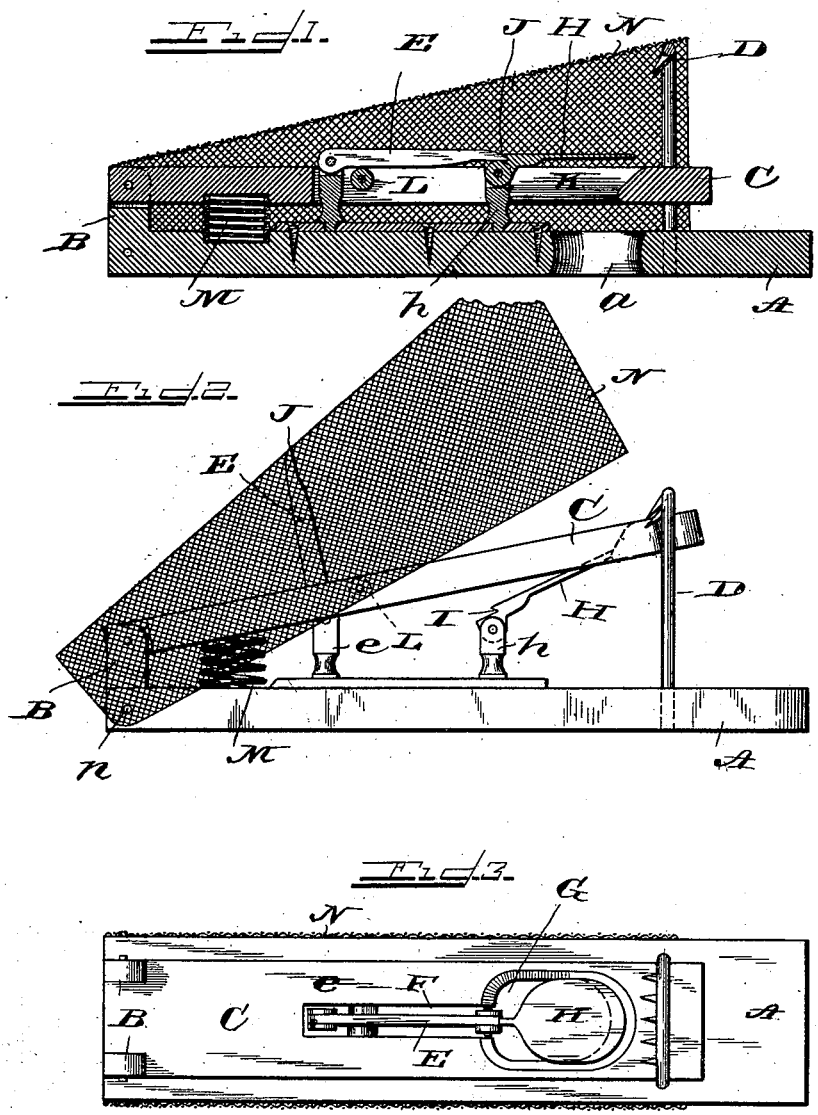
Witnesses
Ira L. Perry
S B Weir
Inventor
John W. Craig,
By H. M. Richards and
Raymond & Omohundro, Att'ys

UNITED STATES PATENT OFFICE.

JOHN W. CRAIG, OF KIRKWOOD, ILLINOIS, ASSIGNOR OF TWO-THIRDS TO ELIZABETH T. CRAIG, OF SAME PLACE, AND GEORGE A. SCHUSSLER, OF MONMOUTH, ILLINOIS.

ANIMAL-TRAP.

SPECIFICATION forming part of Letters Patent No. 665,597, dated January 8, 1901.

Application filed April 18, 1900. Serial No. 13,340. (No model.)

*To all whom it may concern:*

Be it known that I, JOHN W. CRAIG, a citizen of the United States, residing at Kirkwood, in the county of Warren and State of Illinois, have invented certain new and useful Improvements in Animal-Traps, of which the following is a specification.

My invention relates to certain new and useful improvements in animal-traps; and its object is to provide a simple and inexpensive trap which can be easily and quickly set in position for operation without danger to the operator and which will be sprung at the proper time and in such a manner as to catch and securely hold the animal against escape.

Heretofore animal-traps have usually been made with a spring-actuated jaw which is tripped by the animal and thereupon strikes and holds the animal against the base of the trap. My invention involves a distinct departure from this general construction in that I employ a fixed arch corresponding to the jaw and a spring-operated striking-plate, upon which the animal stands and which clamps the animal between itself and the arch.

In the accompanying drawings, Figure 1 is a longitudinal sectional view of a trap embodying my invention and shown in set position. Fig. 2 is a side elevation showing the trap sprung. Fig. 3 is a top plan view.

Referring to the drawings, in which like letters of reference denote corresponding parts in the several figures, A designates the base of my improved trap, which may be made of any material and in any size or shape, as occasion requires. This base is provided with an opening $a$ and the uprights B at its rear end, to which the striking-plate C is pivoted. The forward end of this striking-plate projects through and a short distance beyond the fixed arch D, mounted on the base and provided with one or more prongs or teeth $d$, if desired. These prongs may be arranged on the end of the striking-plate instead of on the arch, or they may be employed in both places.

A trigger E is pivotally mounted on a support $e$, secured to the base, and it operates through a longitudinal slot F in the striking-plate, this slot communicating with an opening G in the striking-plate. A bait-pan H is pivotally mounted on a support $h$, fastened to the base, and it is provided also with a notch I to receive the end J of the trigger. The walls K of the opening G are beveled, so that the bait pan or plate will rest and operate easily thereon when the trap is sprung, Fig. 3. A cross-piece L is secured to the striking-plate in the slot F, so that it will bear against the trigger and release the latter from engagement with the bait-pan just as soon as the latter is depressed, thereby permitting the striking-plate to be forced upward by the spring M to clamp the animal between said plate and the arch.

This being the general construction of my invention, its operation is very simple and will be readily understood. In setting the trap the striking-plate is depressed so that the trigger will fall by gravity until its point J engages the notch in the bait-pan, and in order that this engagement may be made with absolute surety I provide an opening $a$ in the base, through which the operator may pass his finger to press the pan upward, thereby causing the point of the trigger to lock in the notch of the pan. By reason of the engagement of the cross-piece L and the trigger the spring is always pressing the striking-plate upward, and therefore when the animal depresses the bait-pan the trigger will be carried out of engagement with the bait-pan, so that the spring can throw the striking-plate upward and clamp the animal between itself and the arch.

In order that the animal may only enter the trap in the proper way and at the right end thereof, I provide an inclosing screen consisting of wire-netting pivotally secured to the base at $n$ and fitting over the top of the trap and its operative parts. I prefer that the screen N should taper from the front where it rests upon the arch to its pivot at the rear. Furthermore, the pivotal mounting of the screen allows of the screen to closely fit or rest on the arch when the trap is set, thus disguising to some extent said arch. When the trap is sprung, the screen is raised, and hence is not in a position to prevent the proper coöperation of the plate and the impaling pins or projections.

A trap constructed in accordance with my invention can be manufactured inexpensively and will be sprung upon very slight pressure applied to the bait-pan to catch the animal without permitting its escape. It may also be observed that the trap can be set from below in such a manner that there is no danger to the operator in arranging the trap in set position.

Having thus fully described my invention, what I claim, and desire to secure by Letters Patent, is—

1. In an animal-trap, the combination with a base, a fixed arch, a pivoted spring-operated striking-plate, and devices for holding said plate in set position, of a screen pivotally connected to the base and normally forming a partial inclosure for the catching devices, said spring being movable on its pivot when the plate is sprung, substantially as described.

2. In an animal-trap, the combination with a base, a fixed arch, a spring-operated striking-plate, pivoted at one end and having its other end operating under the arch and devices for normally holding said striking-plate in set position, of a screen pivotally connected to the base and normally forming a partial inclosure for the catching devices, said spring being movable on its pivot when the plate is sprung, substantially as described.

3. In an animal-trap, the combination with a base, a fixed arch, a spring-operated striking-plate operating beneath the arch, a bait-pan, and a trigger engaging the bait-pan and holding the striking-plate in set position, of a screen pivotally connected to the base and normally forming a partial inclosure for the catching devices, said spring being movable on its pivot when the plate is sprung, substantially as described.

4. In an animal-trap the combination with a base, a fixed arch, a spring-operated striking-plate pivoted to the base at one end and operating beneath the arch, a support $h$ on the base, a bait-pan pivoted to said support and provided with a notch, a trigger pivotally supported on the base and adapted to have its end engage with the notch in the bait-pan and a cross-piece on the striking-plate to engage the under side of the trigger, of a screen pivotally connected to the base and normally forming a partial inclosure for the catching devices, said spring being movable on its pivot when the plate is sprung, substantially as described.

5. In an animal-trap, the combination with a base, and means for catching an animal, of a screen covering the catching means and pivotally secured to the base, substantially as described.

6. In an animal-trap the combination of a base, a fixed arch mounted on the base at one end thereof, a screen pivoted to the other end of the base and tapering from the arch to its pivoted end, and devices arranged beneath the screen for catching an animal, substantially as described.

JOHN W. CRAIG.

Witnesses:
W. K. GAMBLE,
G. M. FOOTE.